(12) United States Patent
Normile et al.

(10) Patent No.: US 8,830,092 B2
(45) Date of Patent: *Sep. 9, 2014

(54) COMPLEXITY-AWARE ENCODING

(75) Inventors: Jim Normile, Los Altos, CA (US);
Thomas Pun, San Jose, CA (US);
Xiaojin Shi, Fremont, CA (US); Xin Tong, Sunnyvale, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 353 days.

This patent is subject to a terminal disclaimer.

(21) Appl. No.: 13/156,610

(22) Filed: Jun. 9, 2011

(65) Prior Publication Data

US 2011/0234430 A1    Sep. 29, 2011

Related U.S. Application Data

(63) Continuation of application No. 12/256,271, filed on Oct. 22, 2008, now Pat. No. 7,969,333, which is a continuation of application No. 11/519,843, filed on Sep. 11, 2006, now Pat. No. 7,456,760.

(51) Int. Cl.
*H03M 7/00*    (2006.01)

(52) U.S. Cl.
USPC .............................................. 341/51; 341/50

(58) Field of Classification Search
USPC .................. 341/51, 50; 710/33, 72; 375/240; 725/150
See application file for complete search history.

(56) References Cited

U.S. PATENT DOCUMENTS

| 4,958,226 A | 9/1990 | Haskell et al. |
| 5,313,204 A | 5/1994 | Semasa et al. |
| 5,408,328 A | 4/1995 | Boliek et al. |
| 5,414,469 A | 5/1995 | Gonzales et al. |
| 5,465,119 A | 11/1995 | Demos |
| 5,467,136 A | 11/1995 | Odaka et al. |
| 5,488,418 A | 1/1996 | Mishima et al. |
| 5,532,747 A | 7/1996 | Yoon et al. |
| 5,539,468 A | 7/1996 | Suzuki et al. |
| 5,612,735 A | 3/1997 | Haskell et al. |

(Continued)

FOREIGN PATENT DOCUMENTS

| EP | 0 854 652 A1 | 7/1998 |
| EP | 0910219 A2 | 4/1999 |

(Continued)

OTHER PUBLICATIONS

Japanese Office Action, dated Jun. 17, 2011, from corresponding Japanese Patent Application No. 2009-527621 filed Mar. 10, 2009, with English translation.

(Continued)

*Primary Examiner* — Peguy Jean Pierre
(74) *Attorney, Agent, or Firm* — Kenyon & Kenyon LLP

(57) ABSTRACT

Techniques for encoding data based at least in part upon an awareness of the decoding complexity of the encoded data and the ability of a target decoder to decode the encoded data are disclosed. In some embodiments, a set of data is encoded based at least in part upon a state of a target decoder to which the encoded set of data is to be provided. In some embodiments, a set of data is encoded based at least in part upon the states of multiple decoders to which the encoded set of data is to be provided.

22 Claims, 10 Drawing Sheets

(56) References Cited

U.S. PATENT DOCUMENTS

| | | | |
|---|---|---|---|
| 5,619,256 | A | 4/1997 | Haskell et al. |
| 5,633,684 | A | 5/1997 | Teranishi et al. |
| 5,699,117 | A | 12/1997 | Uramoto et al. |
| 5,742,343 | A | 4/1998 | Haskell et al. |
| 5,757,971 | A | 5/1998 | Kim |
| 5,778,097 | A | 7/1998 | Nickerson |
| 5,786,855 | A | 7/1998 | Chen et al. |
| 5,825,421 | A | 10/1998 | Tan |
| 5,886,736 | A | 3/1999 | Chen |
| 5,952,943 | A | 9/1999 | Walsh et al. |
| 5,978,509 | A | 11/1999 | Nachtergaele et al. |
| 5,999,189 | A | 12/1999 | Kajiya et al. |
| 6,005,623 | A | 12/1999 | Takahashi et al. |
| 6,005,980 | A | 12/1999 | Eifrig et al. |
| 6,026,183 | A | 2/2000 | Talluri et al. |
| 6,043,846 | A | 3/2000 | Shen et al. |
| 6,057,884 | A | 5/2000 | Chen et al. |
| 6,097,842 | A | 8/2000 | Suzuki et al. |
| 6,144,701 | A | 11/2000 | Chiang et al. |
| 6,148,026 | A | 11/2000 | Puri et al. |
| 6,226,410 | B1 | 5/2001 | O'Rourke |
| 6,233,356 | B1 | 5/2001 | Haskell et al. |
| 6,266,817 | B1 | 7/2001 | Chaddha |
| 6,301,385 | B1 | 10/2001 | Chen et al. |
| 6,310,857 | B1 | 10/2001 | Duffield et al. |
| 6,317,131 | B2 | 11/2001 | Basso et al. |
| 6,330,280 | B1 | 12/2001 | Suzuki et al. |
| 6,347,116 | B1 | 2/2002 | Haskell et al. |
| 6,412,011 | B1 | 6/2002 | Agraharam et al. |
| 6,526,177 | B1 | 2/2003 | Haskell et al. |
| 6,542,549 | B1 | 4/2003 | Tan et al. |
| 6,556,625 | B2 | 4/2003 | Haskell et al. |
| 6,580,832 | B1 | 6/2003 | Kim et al. |
| 6,704,360 | B2 | 3/2004 | Haskell et al. |
| 6,707,949 | B2 | 3/2004 | Haskell et al. |
| 6,731,811 | B1 | 5/2004 | Rose |
| 6,993,201 | B1 | 1/2006 | Haskell et al. |
| 7,030,784 | B2 | 4/2006 | Schouhamer Immink |
| 7,355,530 | B2 * | 4/2008 | Labelle ............ 341/51 |
| 7,456,760 | B2 | 11/2008 | Normile et al. |
| 7,457,362 | B2 | 11/2008 | Sankaran |
| 7,535,383 | B2 | 5/2009 | Segall et al. |
| 7,656,318 | B2 * | 2/2010 | Guleryuz et al. ............ 341/51 |
| 2002/0031276 | A1 | 3/2002 | Yagishita et al. |
| 2002/0154699 | A1 | 10/2002 | Yamaguchi et al. |
| 2003/0112366 | A1 | 6/2003 | Baylon et al. |
| 2003/0198294 | A1 | 10/2003 | Zaccarin |
| 2004/0008898 | A1 | 1/2004 | Song et al. |
| 2004/0101059 | A1 | 5/2004 | Joch et al. |
| 2004/0158878 | A1 | 8/2004 | Ratnakar et al. |
| 2005/0024651 | A1 | 2/2005 | Yu et al. |
| 2005/0035886 | A1 | 2/2005 | Labelle |
| 2005/0195901 | A1 | 9/2005 | Pohjola et al. |
| 2005/0201469 | A1 | 9/2005 | Sievers et al. |
| 2005/0201627 | A1 | 9/2005 | Liang et al. |
| 2005/0249285 | A1 | 11/2005 | Chen et al. |
| 2006/0165168 | A1 | 7/2006 | Boyce et al. |
| 2007/0116124 | A1 | 5/2007 | Wu et al. |
| 2007/0116126 | A1 | 5/2007 | Haskell et al. |
| 2007/0217503 | A1 | 9/2007 | Haskell et al. |
| 2008/0031356 | A1 | 2/2008 | Uchida et al. |
| 2008/0055623 | A1 * | 3/2008 | Piersol et al. ............ 358/1.13 |
| 2008/0062018 | A1 | 3/2008 | Normile et al. |
| 2008/0095238 | A1 | 4/2008 | Wu et al. |
| 2008/0152009 | A1 | 6/2008 | Akyol et al. |
| 2008/0181298 | A1 | 7/2008 | Shi et al. |
| 2008/0253461 | A1 | 10/2008 | Lin et al. |
| 2008/0253463 | A1 | 10/2008 | Lin et al. |
| 2009/0180545 | A1 | 7/2009 | Wu et al. |
| 2009/0285308 | A1 | 11/2009 | Panchapakesan et al. |
| 2009/0304086 | A1 | 12/2009 | Shi et al. |
| 2010/0128778 | A1 | 5/2010 | Ji et al. |
| 2010/0208806 | A1 | 8/2010 | Yu et al. |
| 2011/0188574 | A1 | 8/2011 | Matsuo et al. |

FOREIGN PATENT DOCUMENTS

| | | |
|---|---|---|
| JP | H06-326856 A | 11/1994 |
| JP | H11-127288 A | 5/1999 |
| JP | 2000-244909 A | 9/2000 |
| JP | 2000-347968 A | 12/2000 |
| JP | 2001-256144 A | 9/2001 |
| JP | 2003-235041 A | 8/2003 |
| JP | 2006-099404 A | 4/2006 |
| JP | 2006-115168 A | 4/2006 |
| JP | 2006-197186 A | 7/2006 |
| WO | 2003/029989 A1 | 4/2003 |
| WO | 2005002233 A1 | 1/2005 |
| WO | 2005084035 A2 | 9/2005 |
| WO | 2006080261 A2 | 8/2006 |
| WO | 2007109186 A2 | 9/2007 |
| WO | 2008011502 A2 | 1/2008 |
| WO | 2008033830 A2 | 3/2008 |
| WO | 2010/047104 A1 | 4/2010 |

OTHER PUBLICATIONS

Wang et al., "Boundary-energy sensitive visual de-blocking for H.264/AVC coder," Proceedings of SPIE, vol. 5558, 2004, pp. 512-523 (XP040191188).
Li et al., "Memetic Gradient Search," Evolutionary Computation, 2008 IEEE Congress on Evolutionary Computation, pp. 2894-2901, Jun. 1, 2008.
Nocedal and Wright, "Numerical Optimization," Springer Series in Operations Research, pp. 1-9, 35-36, 165-167 (1999) (XP002682761).
List et al., "Adaptive Deblocking Fliter," IEEE Transactions on Circuits and Systems for Video Technology, (13)7:614-619, Jul. 1, 2003.
Bronstein et al., " Numerical Optimization (42 Slides)", VIPS Advanced School on Numerical Geometry of Non-Rigid Shapes, University of Verona, Apr. 2010, pp. 1-8, XP002682762, Retrieved from Internet on Sep. 4, 2012: URL:http://www.toldo.info/vipsschool/slides/VIPS2010_optimization.pdf.
"International Organization for Standardisation—Working Draft 4.0 of ISO/IEC 14496-2," ISO/IEC JTC1/SC29/WG11 N1797, MPEG97/Stockholm, Jul. 1997.
"International Organization for Standardisation—MPEG-4 Video Verification Model Version 2.1," ISO/IEC JTC1/SC29/WG11 XXXX of May 3, 1996.
"International Organization for Standardisation—Generic Coding of Moving Pictures and Associated Audio Information: Video, Recommendation H.262," ISO/IEC 13818-2 JTC1/SC29/WG11 N0702 (revised), incorporating N702 Delta of Mar. 24 and furthereditorial corrections May 10, 1994.
International Organization for Standardization; Results of Scalability Experiments; ISO/IEC JTC1/SC29/WG11; MPEG96/1084, Jul. 1996 Tampere.
International Organization for Standarisation; Working Draft 1.0 of ISO/IEC 14496-2; ISO/IEC JTC1/SC29/WG11 N1470; MPEG/Maceio, Nov. 1996.
Mar. 11, 2008 International Search Report for PCT/US07/078148, mailed on Apr. 11, 2008.
Ramanujan R S et al: "Adaptive streaming of MPEG video over IP networks", Local Computer Networks, 1997. Proceedings. , 22nd Annual Conference on Minneapolis, MN, USA Nov. 2-5, 1997, Los Alamitos, CA, USA, IEEE Comput. Soc, US, Nov. 2, 1997,' pp. 398-409, XP01025244.5.
International Search Report, mailed Mar. 4, 2010, from corresponding International Application No. PCT/US2009/046079.
Warsaw et al., "Architecture Design of an H.264/AVC Decoder for Real-Time FPGA Implementation," Application-specific Systems, Architectures and Processors, 2006, IEEE, pp. 253-256.
Hu et al., "Decoder-Friendly Adaptive Deblocking Filter (DF-ADF) Mode Decision in H.264/AVC," Circuits and Systems, IEEE 2007, pp. 3976-3979.
Japanese Office Action, mailed Mar. 4, 2013, from corresponding Japanese Patent Application No. 2011-200928 filed Sep. 14, 2011.

* cited by examiner

COMPLEXITY-AWARE ENCODING

RELATED APPLICATIONS

This application is a continuation of U.S. patent application Ser. No. 12/256,271 filed on Oct. 22, 2008, which is a continuation of U.S. patent application Ser. No. 11/519,843, filed Sep. 11, 2006, now U.S. Pat. No. 7,456,760.

BACKGROUND OF THE INVENTION

Typically, the selection of one or more encoding schemes at an encoder for data, such as frames of a video sequence, is determined without knowledge or consideration of the effect particular encoding decisions and/or sequences of decisions will have on the dynamic state of a decoder that is being used and/or is to be used to decode the encoded data. Most commonly, data is encoded in a manner that balances data transfer rate against distortion without consideration of the effect on the dynamic state of a particular decoder, and minimum decoder and/or decoding system requirements to ensure adequate decoding are specified, essentially limiting use to users having decoders that meet the minimum requirements. As a result, if the decoding of one or more portions of the encoded data can not be adequately handled by the decoding resources available at a particular decoder, degradation in the decoding performance and compromised playback quality may be experienced. It would be desirable for the decoding of encoded data to be within the decoding capabilities and resources at a decoder.

Thus, there is a need for an improved manner to encode data based on knowledge of target decoders.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for encoding data based at least in part upon an awareness of the decoding complexity of the encoded data and the ability of a target decoder to decode the encoded data are disclosed. In some embodiments, a set of data is encoded based at least in part upon a state of a target decoder to which the encoded set of data is to be provided. In some embodiments, a set of data is encoded based at least in part upon the states of multiple decoders to which the encoded set of data is to be provided.

Figure 1A:
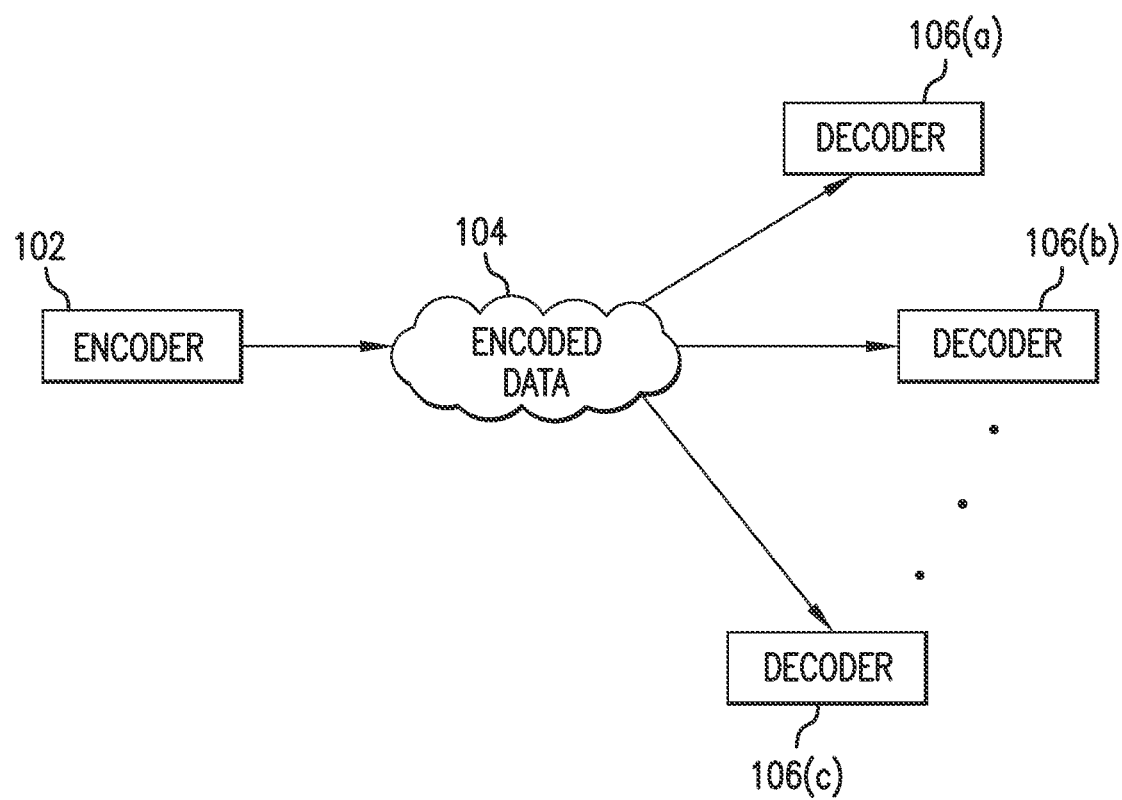
FIG. 1A illustrates a typical embodiment of a codec.

FIG. 1A illustrates a typical embodiment of a codec. As depicted, an encoder 102 encodes media data, such as audio, video, audiovisual, and/or other multimedia content, and provides encoded data 104 to one or more decoders 106. Depending on the embodiment, the encoded data is provided via a network or other communication channel; stored on a volume of movable media, such as a DVD or CD; transmitted via radio frequencies, such as a digital radio broadcast or a wireless network connection; stored on a server and made available for download and subsequent playback on a PC, portable music/video player, or other device; etc. At a decoder 106, the encoded data 104 is decoded to retrieve the encoded content, for example, for displaying, playback, editing, etc. As shown in the given example, it may be desirable to provide the encoded data 104 to a plurality of decoders 106 on potentially different types of devices, such as handheld computing devices, laptops, desktops, set top boxes, mp3 players, etc. However, the resources available for decoding may vary across different types of devices and different types of decoders. Factors such as available processing speed, power consumption limitations, available memory, factors associated with decoder architecture (e.g., the extent of parallel processing possible), the computational complexity of the available decoding algorithm, etc., affect decoding performance at each decoder.

The encoding of data at an encoder is typically determined without consideration of the effect particular encoding decisions and/or sequences of decisions will have on the dynamic state of a decoder that is being used and/or is to be used to decode the encoded data. Data with a particular encoding scheme is typically associated with minimum processing requirements that need to be performed at the decoder side to adequately uncompress the encoded data. If a decoder is not able to provide the minimum processing requirements, decoding of the encoded data at such a decoder may not be possible at all or may at least in part be compromised, e.g., the quality of the decoder output may be affected due to one or more decoding operations not being performed, the decoder might start dropping or skipping data, etc. In the configuration of FIG. 1A, data with the same encoding 104 is provided to a plurality of decoders 106. However, given the same encoding scheme of the data, the manner and quality of decoding the encoded data 104 by the different decoders 106 may be different depending on the availability of decoding resources at each decoder 106.

In order to provide to a target decoder encoded data with an encoding scheme that can adequately be handled by available decoding resources at the target decoder, encoding data at an encoder based at least in part upon knowledge of a current and/or projected state of the target decoder to which the encoded data is to be provided is disclosed. As is disclosed herein, in order to make data available to a variety of devices with potentially different decoding capabilities and resources, or to make data available to a single type of decoder in a manner that takes into consideration the effect of encoding decisions on a dynamic (current, future, and/or predicted) state of a target decoder, in some embodiments for each target decoder encoding decisions are made based at least in part upon knowledge of the decoding resources available at the target decoder. In some embodiments, encoding data based at least in part upon a past, current, future, and/or predicted state of the decoder to which the encoded data is to be provided results in improved decoding performance to be experienced at a target decoder by allowing the optimal or near optimal decoding potential at the target decoder to be realized while still conforming to associated decoding constraints at the target decoder. In some embodiments, encoding data based at least in part upon a past, current, future, and/or predicted state of the decoder to which the encoded data is to be provided results in improved decoding performance to be experienced at a target decoder via the selection and/or customization of the most relevant encoding tools for the target decoder while still conforming to associated decoding constraints at the target decoder.

Figure 1B:
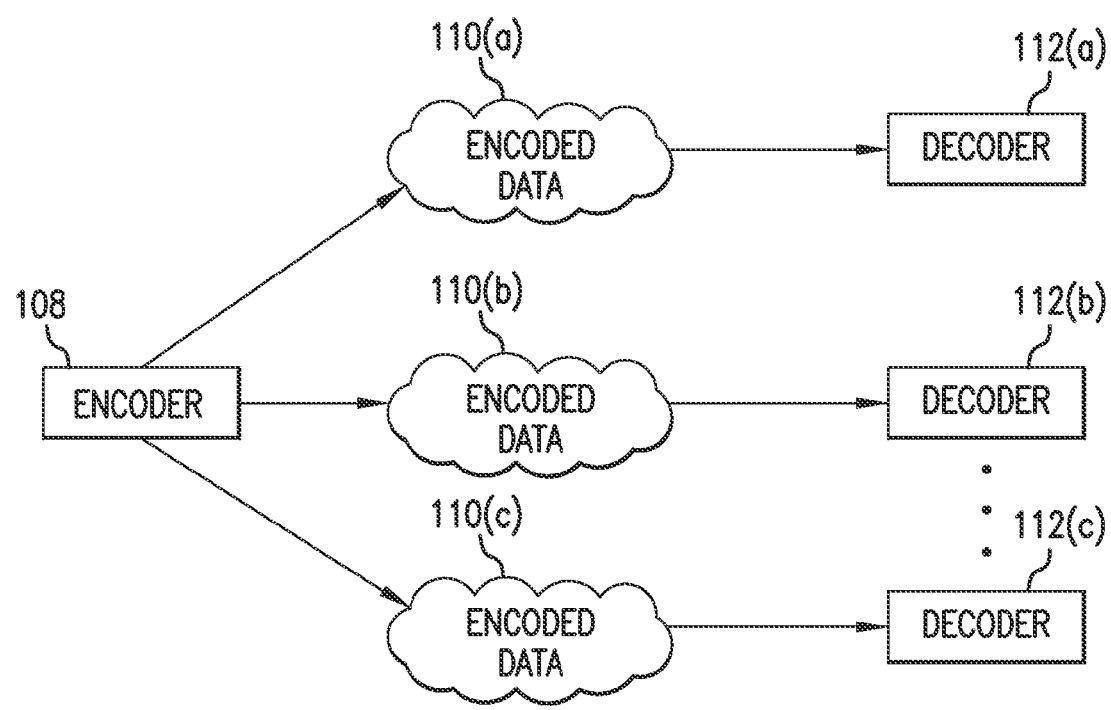
FIG. 1B illustrates an embodiment of a codec in which data is encoded with different encoding schemes.

FIG. 1B illustrates an embodiment of a codec in which data is encoded with different encoding schemes. As depicted, an encoder 108 provides encoded data 110 with potentially different encoding schemes to decoders 112. At a decoder 112, the encoded data 110 is decoded to retrieve the encoded content, for example, for displaying, playback, editing, etc. In some embodiments, a customized encoding scheme is selected by an encoder for each decoder to which data is to be provided. In some embodiments, customized encoding schemes are selected by an encoder for multiple decoders to which data is to be provided. Such customized encoding schemes allow decoders to obtain different decoding qualities depending upon available resources. In some embodiments, the same data is encoded at an encoder in multiple ways using a prescribed set of encoding schemes, and data encoded with an encoding scheme most suitable for a particular decoder is provided to that decoder. In some embodiments, the encoding scheme selected at an encoder for a particular target decoder may be varied as data is provided to the target decoder and may depend upon, for example, knowledge of the estimated performance of the target decoder based upon a model associated with the resources available at the target decoder for decoding, knowledge of the cost of performing various decoding operations at the target decoder, dynamic feedback from the target decoder relating to its current performance and decoding capabilities, knowledge of the decoding complexity of the encoded data that has already been or that needs to be provided to the target decoder within a prescribed time frame or window, knowledge of the complexity of the content of data that is to be provided to the target decoder, etc. By intelligently encoding data based upon the decoding capabilities of the intended target decoder and the complexity of input data, it is possible to optimize the decoding performance and quality of a target decoder.

In some embodiments, an encoder (e.g., 108 of FIG. 1B) encodes video data frame by frame and transmits the encoded video data (e.g., 110 of FIG. 1B) to a target decoder (e.g., 112 of FIG. 1B). In some embodiments, encoder 108 encodes video data frame by frame and stores the encoded video data 110 on stationary (e.g., server) and/or movable (e.g., DVD, CD) storage media for subsequent use by a target decoder 112 (e.g., after download or by inserting movable media into a drive or other storage media reading device associated with the target decoder 112). The encoding scheme of each frame may be varied at the encoder as encoded data is transmitted to a target decoder, in the case of encoded data that is transmitted (e.g., broadcast, streamed via a network or other communication channel), or determined for each frame based at least in part on a predicted state of a target decoder at a time of future decoding of the frame, e.g., based on a model of the decoder and its predicted state after decoding preceding frames as encoded, in the case of data being encoded and stored on a server or movable media for future provision to and use by a target decoder. In some embodiments, the encoding schemes of frames comprising video data are varied at the encoder so as to optimize the viewing experience of the video data at the decoder side. In some embodiments, the encoding schemes of frames comprising video data are varied at the encoder so as to optimize the viewing experience of the video data at multiple decoders with different decoding resources. In some embodiments, video data is encoded by an encoder with respect to the H.264 standard. As is disclosed herein, in some embodiments, the complexity selected for an H.264 encoded bit stream is based at least in part on an estimate of the capabilities of a target decoder, which in some embodiments is expressed as a complexity or cost constraint. In such cases, an appropriate encoding scheme is selected using the complexity or cost constraint measure associated with a target decoder so that the complexity of the encoded bit stream can be adequately handled and played back well by the target decoder. In some embodiments, the encoding scheme of a frame includes scalability layers that allow graceful degradation at a target decoder when necessary, such as, for example, when the target decoder can not keep up with the playback; when processing power available for decoding is limited, e.g., due to other processes running in parallel on the associated device; when processing and/or battery power is desired to be conserved at the target decoder; etc. In some embodiments, content is encoded at an encoder in a manner that maximizes the battery life of a target device at which the encoded content is to be decoded. Such an encoding scheme is particularly useful for portable devices, such as hand held devices, mp3 players, laptop computers, etc.

Although video encoding (e.g., in terms of encoding the various frames comprising a sequence of video content) and the H.264 standard may be sometimes described, the techniques described herein are not limited to the encoding of video data or to the H.264 standard. Rather the techniques described herein may be employed to encode any type of content, data, or set of data, such as text, images, graphics, animation, audio, video, etc., that is encoded with respect to any appropriate standard or protocol.

Figure 2:
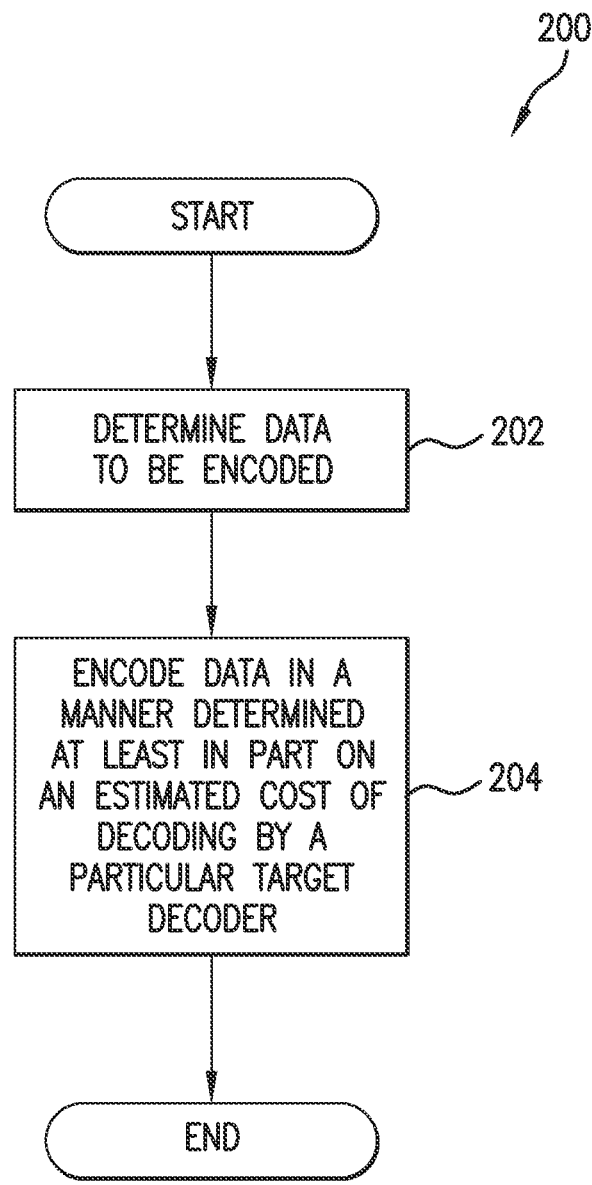
FIG. 2 illustrates an embodiment of a process for encoding data.

FIG. 2 illustrates an embodiment of a process for encoding data. In some embodiments, process 200 is employed by encoder 108 to custom encode data 110 for a target decoder 112. Process 200 begins at 202 at which the data or content to be encoded is determined. In some embodiments, the data of 202 corresponds to a single frame of video data. At 204, the data determined at 202 is encoded in a manner determined at least in part on an estimated cost of decoding the encoded data by a particular target decoder. In some embodiments, 204 includes determining a target decoding complexity for the data of 202 and encoding the data of 202 in a manner such that the decoding complexity of the encoded data does not exceed the determined target complexity. In various embodiments, the target complexity for a particular frame (or other unit) is determined at least in part by a dynamically determined, estimated, and/or predicted state of a target decoder and/or a known, estimated, and/or predicted ability of a target decoder to handle and process additional complexity, based for example on knowledge of the decoding resources available at the decoder and/or the complexity of preceding and/or following frames. Process 200 subsequently ends. In the case of video encoding, in some embodiments process 200 is repeated for each frame that is to be encoded and provided to a target decoder.

The estimated cost of decoding at a target decoder is based at least in part upon the availability of decoding resources at the target decoder. In some embodiments, an encoding scheme is selected at 204 of process 200 such that the cost of decoding data encoded with the encoding scheme at the target decoder is within a maximum decoding cost constraint associated with the target decoder so that the encoded data can be adequately decoded at the target decoder with the available decoding resources. In some embodiments, a constraint associated with the maximum decoding complexity that can be adequately handled by the target decoder is employed to determine an appropriate encoding scheme. The complexity constraint may be derived at least in part from the decoding cost constraint or vice versa. In some embodiments, the cost and/or complexity constraints associated with a target decoder are not static values but rather are dynamic quantities that change as the actual or estimated availabilities of decoding resources at the target decoder vary. The terms "cost constraint" and "complexity constraint" are sometimes used interchangeably herein and refer to constraints on the amount of decoding complexity that a particular target decoder can or is expected to be able to handle.

An encoding scheme may involve one or more encoding tools or techniques. Tools available for video encoding include, for example, frame type, motion estimation, interpolation locations, motion vector lengths, vector spread, motion compensation, intra predication, inter prediction, loop filtering, etc., and the operations associated with such tools may be defined by a standard such as H.264. Each tool is associated with a decoder specific complexity. In addition to the encoding tools selected to encode a frame, the complexity of a frame may also depend on other parameters, such as the value of the quantization parameter selected as well as on other steps of decoding such as bit parsing, inverse transform, etc.

The operations associated with the tools used for encoding may require corresponding inverse operations at the decoder side to undo the operations associated with the encoding. Thus, in some embodiments, each tool and/or parameter used in an encoding scheme contributes to the decoding cost or complexity. In some embodiments, a decoder-specific complexity cost is associated with each encoding tool or technique. The complexity costs associated with the various encoding tools and techniques may differ for different target decoders. In some embodiments, every time an encoding tool or technique is employed or invoked when encoding a set of data, such as a frame of video data, that is to be provided to a particular target decoder, the target decoder specific complexity cost associated with the tool or technique is added to a running sum of such complexity costs. As is described in more detail below, the final value of such a summation may serve as a measure of the total decoding complexity of the encoded frame and may be compared with a target complexity to determine if it is within the target complexity and, if not, the encoding scheme of the frame may be altered such that the total decoding complexity of the encoded frame is within the target complexity so that the decoding of the resulting encoded frame can be adequately handled by the target decoder. If the estimated total decoding complexity is lower than the target complexity, more encoding tools can be used to achieve better quality.

In some embodiments, the performance of a target decoder is at least in part estimated at the encoder side from a model of the target decoder. Such a model allows the behavior of a target decoder to be estimated or simulated at the encoder side so that an appropriate encoding scheme can be selected for any given set of data to be encoded, such as a frame of video data. In some embodiments, such a model is based on the decoding resources available at a target decoder. The availabilities of one or more decoding resources may be time variant. In some such cases, dynamic feedback may be provided to an encoder from a target decoder about the availabilities of one or more decoding resources. Examples of resources that may affect decoding performance include, but are not limited to, the available decoding algorithm, available processing speed for decoding, power consumption limitations (e.g., to extend battery life), available memory, the extent of parallel processing possible, etc., of the target decoder and/or the associated device. In some embodiments, a constant processing rate or constant complexity consumption rate is employed in the model for a target decoder. Other factors, such as knowledge of the complexity of encoded data that has already been or that needs to be provided to the target decoder, knowledge of the maximum capacity and/or estimated or actual state of the decoded picture buffer (DPB), knowledge of the display duration of frames provided to the target decoder, etc., are employed in various embodiments in the simulation of the performance of a target decoder at the encoder side.

As mentioned above, the performance of a target decoder in some embodiments is characterized at least in part by the maximum capacity and/or state of the DPB. The DPB at a decoder holds frames that the decoder has decoded but has not yet displayed. A DPB can be characterized by its depth or capacity which may be measured by, for example, the maximum amount of data it can hold, the maximum number of decoded frames that it can hold, etc. Simulated or actual knowledge of the state of the DPB in some embodiments is used to aid in the selection of an appropriate encoding scheme at the encoder side. For example, if it is determined at the encoder that the DPB of the target decoder is close to being depleted, it may be desirable to reduce the complexity of subsequent frames at the encoder. Similarly, if it is determined at the encoder that the DPB of the target decoder is near its full capacity, it may be desirable to inject more complexity into subsequent frames at the encoder so that a better visual quality can be achieved. In some embodiments, knowledge of the current state of the DPB of a target decoder is obtained via simulation at the encoder with a model associated with the target decoder. Such a simulation may employ knowledge of decoding resources, such as the decoding processing rate (i.e.

the rate at which frames are decoded and input into the DPB), maximum capacity of the DPB, the display duration of each frame in the DPB (i.e., the rate at which frames are taken out of the DPB for display), etc., as well as other factors such as knowledge of the complexity and necessary processing time of encoded frames that have been and/or will be provided to the target decoder. In some embodiments, real-time feedback associated with the state of the DBP (e.g., the number of frames the DPB is actually currently holding) is dynamically provided to the encoder by the target decoder so that encoding decisions at the encoder can be based at least in part upon the actual performance of the target decoder.

The model of a target decoder is employed in some embodiments over a sliding window at the encoder side to aid in the selection for each frame of a corresponding set of encoding options so that the complexity variations and quality variations in a bit stream or sequence of encoded video data can be dynamically controlled at the encoder based on actual and/or estimated performance of the target decoder. Such a model of a target decoder, in some embodiments, includes associating a decoding complexity cost with each instance of an encoding option or tool used to encode a frame so that the total complexity of an encoded frame can be determined and compared to the complexity limitations or constraints of the target decoder. In some embodiments, the model of the target decoder at the encoder is employed to determine a target complexity for each frame to be encoded. In some embodiments, a static target complexity value for each frame is associated with a target decoder and may be based upon the available decoding resources or capabilities of the target decoder. In some embodiments, the target complexity for any given frame is dynamic and is determined through simulation of the performance of the target decoder via the model of the target decoder available at the encoder and may depend not only on the decoding resources available at the target decoder but also on the complexity of encoded data already or waiting to be provided to the target decoder, e.g., within a prescribed window or time frame. In some embodiments, the target complexity for a frame is based at least in part upon the content of the current frame and/or previous frames. In some embodiments, the target complexity for a frame is based at least in part upon the importance or significance of the frame relative to other frames in a sequence of video data. For video encoding, for example, in some embodiments factors such as the frame type (e.g., reference frame or non-reference frame) and display duration are taken into consideration in determining the significance of the frame and consequently the target complexity for the frame.

Figure 3:
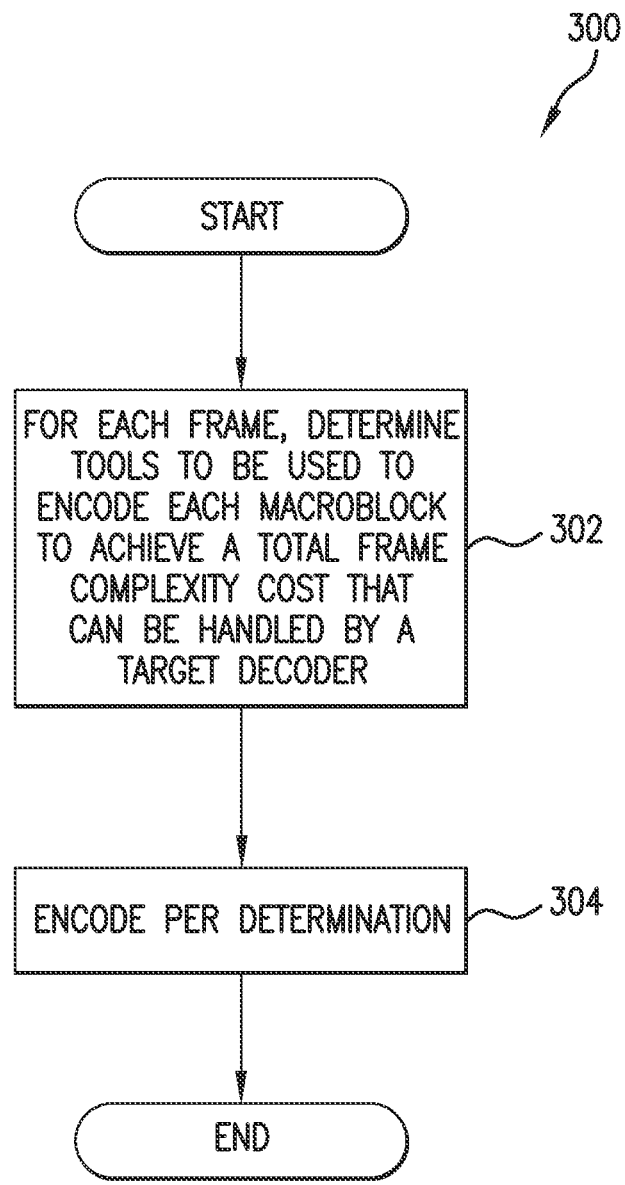
FIG. 3 illustrates an embodiment of a process for encoding video data.

FIG. 3 illustrates an embodiment of a process for encoding video data. In some embodiments, process 300 is employed at 204 of process 200 of FIG. 2. A frame of video data can be subdivided into a plurality of smaller components or units, e.g., slices and macroblocks. In some embodiments, such as in process 300, encoding a frame includes individually encoding the macroblocks comprising the frame. At 302 of process 300, for each frame, a set of encoding tools and techniques are determined for each macroblock comprising the frame in a manner that results in the achievement of a desired total frame complexity cost that can be handled by the target decoder to which the encoded frame is to be provided. In some embodiments, the determinations of the encoding tools that are to be used to encode the macroblocks at 302 are made in a manner that ensures that the complexity of the encoding of a frame as a whole is at or near the target complexity constraint associated with the frame so that optimal or near optimal playback quality can be experienced at the target decoder. At 304, the macroblocks comprising each frame are encoded per the determinations of 302, and process 300 ends.

In some embodiments, one or more of the encoding tools and techniques available at an encoder are used to define a toolset. In some embodiments, an encoder includes a table or list of such toolsets, each of which includes one or more of the encoding tools available at the encoder. In some embodiments, a single toolset is selected to be used to determine the encoding scheme for a frame. In some embodiments, an appropriate encoding scheme is found for a frame after one or more iterations using one or more available toolsets. In some embodiments, when a particular toolset is selected for encoding a particular frame, only one or more of the encoding tools available in the selected toolset may be employed to encode the frame and the macroblocks comprising the frame. In such cases, in some embodiments, a subset of the toolset is selected, as appropriate, to encode each macroblock. The subset of encoding tools selected from the toolset for each macroblock may be different for different macroblocks that comprise the frame and may depend upon factors such as the content or complexity of the macroblock, the relative significance of the macroblock and/or the associated frame, the location of the macroblock within the frame, etc. Different toolsets may differ by the encoding tools included and/or by the complexity cost weightings associated with the tools included in the toolsets. In some embodiments, each of the encoding tools included in a toolset is associated with a complexity cost weighting, i.e. a factor by which the decoder-specific complexity cost of the encoding tool is to be multiplied when computing the complexity cost associated with using the encoding tool. Such weightings may be employed to bias against expensive (i.e. higher cost) decoding operations so that the associated encoding technologies are more sparingly employed when encoding a frame or the macroblocks comprising the frame.

In some embodiments, the available toolsets at an encoder are ranked with respect to the encoding quality, the complexity of encoding tools available in each toolset, and/or the weightings assigned to the tools. For example, a default toolset at an encoder from which an acceptable encoding scheme is first attempted to be determined in some embodiments includes all available encoding tools at an encoder and assigns equal decoding complexity cost weightings (e.g., one) to each of the tools. If the encoding scheme selected for a frame based on such a default toolset has a total complexity that falls within the target complexity of the frame, the encoding scheme is employed to encode the frame. However, if the encoding scheme selected for a frame based on such a default toolset has a total complexity that exceeds the target complexity of the frame, another encoding scheme that is within the target complexity is determined to ensure playback and optimal decoding of the frame at the target decoder. In such cases, one or more iterations through the same toolset and/or one or more other toolsets may need to be performed until a suitable encoding scheme, i.e. an encoding scheme whose decoding complexity is within the target complexity for the frame and achieving the best possible quality, is found. Such iterations can be intelligently performed so that a suitable encoding scheme can be efficiently found. In order to maximize the quality of the encoding while reducing decoding complexity in such cases, in some embodiments the sources of complexity in a given frame (e.g., which tools are contributing most to decoding complexity) are determined and used to intelligently select a toolset for the frame. To reduce the complexity of the encoding, a toolset that assigns higher weights to tools that are more expensive to decode is selected so that such tools are less frequently used when determining an encoding scheme. For example, a default toolset may assign equal complexity cost weightings of one to both 16×16 inter prediction and 8×8 inter prediction; however, another toolset may penalize the more expensive decoding technology by assigning it a higher weight (e.g., 16×16 inter prediction may be assigned a weighting of one while 8×8 inter prediction may be assigned a weight of sixteen) so that it is less frequently used when determining the encoding scheme of a frame or the macroblocks comprising the frame.

In some embodiments, the available toolsets at an encoder have associated quality measures along with complexity costs. The encoder can find the combination of toolsets to find the optimal balance between complexity and quality. One such method is the classical Lagrangian method in which the complexity is minimized with a quality constraint, or more naturally, the distortion is minimized with a complexity constraint.

In some embodiments, encoding tools are selected from a particular toolset to encode a macroblock in a manner that minimizes the cost of decoding while maintaining minimum encoding standards so that at least a minimum decoding quality can be experienced at the target decoder. In some embodiments, the selection of encoding tools from a toolset at the macroblock level is an unconstrained search, e.g., no complexity or cost constraint exists at the macroblock level. In some embodiments, each macroblock is encoded with a combination of encoding tools from a particular toolset that results in an optimal encoding, i.e. minimum error encoding.

As previously mentioned, the total complexity of a frame in some embodiments also depends upon the quantization parameter selected for the encoding of the frame. In some embodiments, the process of determining a suitable encoding scheme (e.g., process 200 of FIG. 2 or process 300 of FIG. 3) for a frame or the macroblocks comprising a frame includes iterating through one or more toolsets and/or quantization parameter values until an encoding scheme with a total decoding complexity value at or below the target complexity is found for the frame.

In some embodiments, the selection of encoding tools for a macroblock is based at least in part upon a rate-distortion optimization formula, such as:

$$C = D + \lambda R \quad (1)$$

wherein C represents the cost of encoding the macroblock, D represents the distortion of the macroblock for the selected encoding, R represents the rate or the number of bits used to encode the macroblock, and λ represents a factor that allows weighting of rate (R) against distortion (D). In some embodiments, a modified version of the rate-distortion optimization formula is employed to take into account the decoding complexity costs of using various encoding tools and techniques for a given target decoder, such as:

$$C = D + \lambda R + \alpha X \quad (2)$$

wherein the additional term X represents the cumulative complexity cost of the encoding tools used to encode the macroblock for a particular target decoder and α represents a factor that allows weighting of complexity (X) against rate (R) and distortion (D). In some embodiments, X includes a complexity cost associated with the quantization parameter selected for the encoding. In some embodiments, X includes complexity cost weightings associated with a particular toolset that is used for determining the encoding scheme. In some embodiments, equations (1) and/or (2) are employed with respect to motion estimation search and/or mode decisions for a macroblock. In some embodiments, at each macroblock, it is desirable to find the encoding mode with the best trade-off between distortion, rate, and/or complexity given a toolset from which to select. In some embodiments, an encoding with a minimum cost C is desirable at each macroblock and iteratively found at each macroblock given a toolset from which to select encoding tools.

In some embodiments, the values of the cost functions (e.g., C of Equation 1 or 2) of all of the macroblocks comprising a frame may be added together to generate a cumulative value representing the total cost or part of the total cost of encoding the frame with the selected encoding scheme (i.e., the encoding tools selected for the macroblocks and frame). Such a value may be compared to a cost constraint for the frame to determine whether the encoding scheme is acceptable and will be able to be adequately handled by the target decoder to which the encoded frame is to be provided. In some embodiments, the cumulative complexity costs (X) of all of the macroblocks are added together to generate another (or different) cumulative value representing the total decoding complexity cost or part of the total decoding complexity cost of the encoded frame, and such a value is compared to the target decoding complexity determined for the frame to determine whether the encoding scheme is acceptable and will be able to be adequately handled by the target decoder. In some embodiments, the total complexity of a frame is computed by:

$$X_{frame} = \sum_{i=1}^{N} n_i X_i \quad (3)$$

wherein $X_{frame}$ represents the total complexity of the frame, i represents an encoding tool (e.g., a tool in a selected toolset used for encoding the frame), N represents the total number of different encoding tools used in the encoding of the frame, $n_i$ represents the number of times encoding tool i is employed in the encoding of the frame (e.g., the number of macroblocks that use tool i), and $X_i$ represents the decoding complexity cost for encoding tool i for a particular target decoder. In some embodiments, one term of Equation 3, i.e. one value of i, corresponds to the complexity cost associated with the quantization parameter selected for a given encoding scheme. In some embodiments, each $X_i$ includes a target decoder specific complexity cost weighting associated with a particular toolset that is used for determining the encoding scheme.

Figure 4:
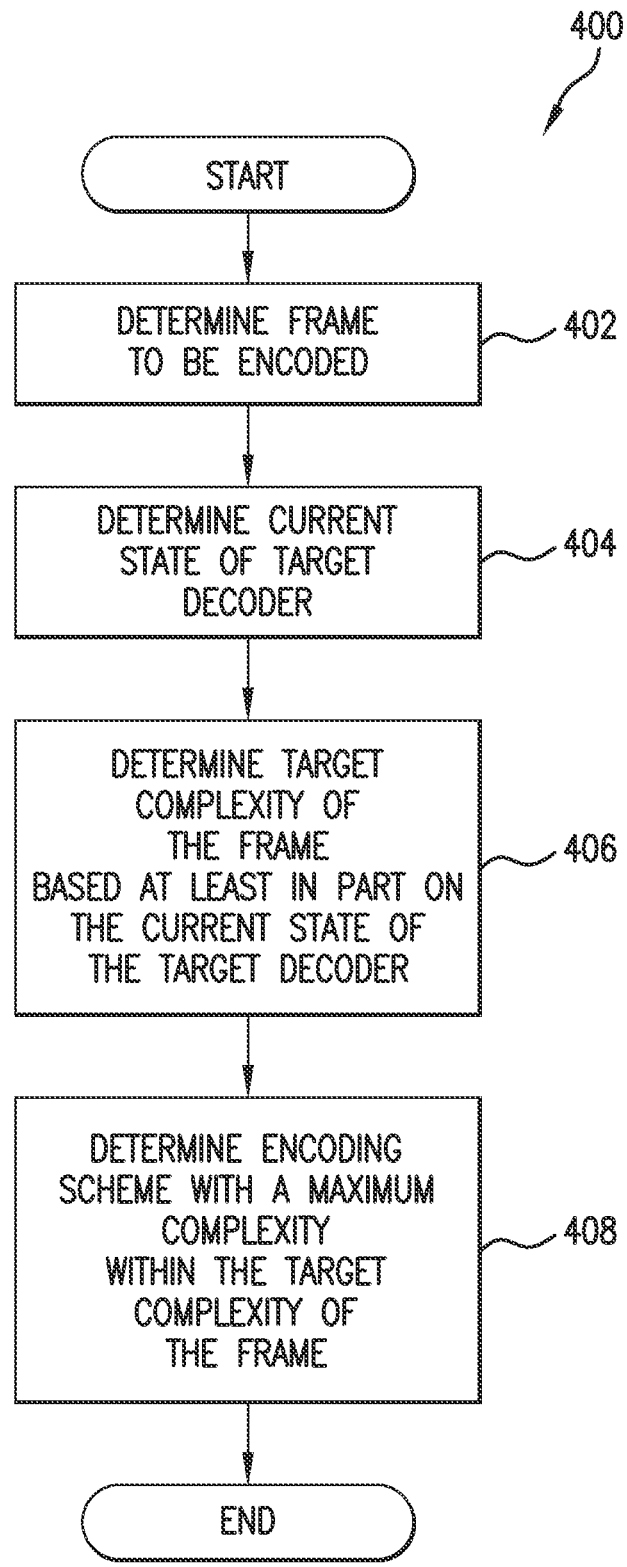
FIG. 4 illustrates an embodiment of a process for determining an encoding scheme for a frame of video data.

FIG. 4 illustrates an embodiment of a process for determining an encoding scheme for a frame of video data. In some embodiments, process 400 is employed at 302 of FIG. 3. Process 400 begins at 402 at which a frame that needs to be encoded is determined or received. At 404, the current state or performance of the target decoder to which the frame of 402 is to be provided is determined. In some embodiments, 404 includes estimating the current state of the target decoder based at least in part upon a simulation of a model associated with the target decoder and/or knowledge of the complexity of the frames that have already been or that need to be provided to the target decoder for decoding. In some embodiments, 404 includes receiving dynamic feedback from the target decoder relating to the current state or performance of the target decoder. In some embodiments, 404 includes determining through simulation the state of the DPB of the target decoder. In some embodiments, 404 includes receiving from the target decoder dynamic feedback regarding the current state of the DPB and employing the actual state of the DPB in the determination of the current performance of the target decoder. In some embodiments, the determination of the current state of the target decoder at 404 and/or knowledge of the complexities and/or content of other frames in a sequence of video data are employed to estimate the availability of decoding resources at the target decoder at the time the frame of 402 is to be decoded.

At 406, a target complexity for the frame of 402 is determined based at least in part upon the current state of the target decoder determined at 404. In some embodiments, the determination of the target complexity at 406 is based at least in part upon the expected availability of decoding resources at the target decoder at the time the frame is expected to be decoded at the target decoder. In some embodiments, the target complexity of the frame determined at 406 is based at least in part upon the complexity of the content of the frame. In some embodiments, the target complexity determined at 406 is based at least in part upon the significance of the frame relative to other frames in an associated sequence of video data. For example, in some embodiments, the target complexity determined at 406 is based at least in part upon whether the frame is a reference frame or a non-reference frame. In some embodiments, the target complexity determined at 406 is based at least in part upon the complexity of the content and/or significance of one or more subsequent frames in an associated video sequence that are to be encoded and provided to the target decoder after the current frame, i.e. the frame determined at 402. In some embodiments, the target complexity determined at 406 is based at least in part upon other factors, such as the desire to conserve processing and/or battery power at the target decoder, in which cases a lower target complexity for the frame may be determined at 406 compared to what would otherwise have been determined had the full decoding resources and/or potential at the target decoder been available for decoding the encoded frame.

At 408, an encoding scheme with a maximum complexity within (i.e. less than or equal to) the target complexity of 406 is determined for the frame. In some cases, it is desirable to encode a frame at 408 with a complexity at or near the target complexity so that an optimal playback quality can be experienced at the target decoder while still satisfying decoding resource constraints at the target decoder. In some embodiments, 408 includes determining an encoding scheme with a complexity within the target complexity determined for the frame at 406 but does not include searching or iterating to find an encoding scheme with a maximum complexity within the target complexity given the available toolsets and/or quantization parameter values available for encoding. In some such cases, the first encoding scheme determined for the frame whose complexity satisfies the target complexity constraint and/or is within a prescribed range of the target complexity is employed to encode the frame. Process 400 subsequently ends. In some embodiments, process 400 is repeatedly performed to encode one or more frames included in a sequence of video data.

Figure 5:
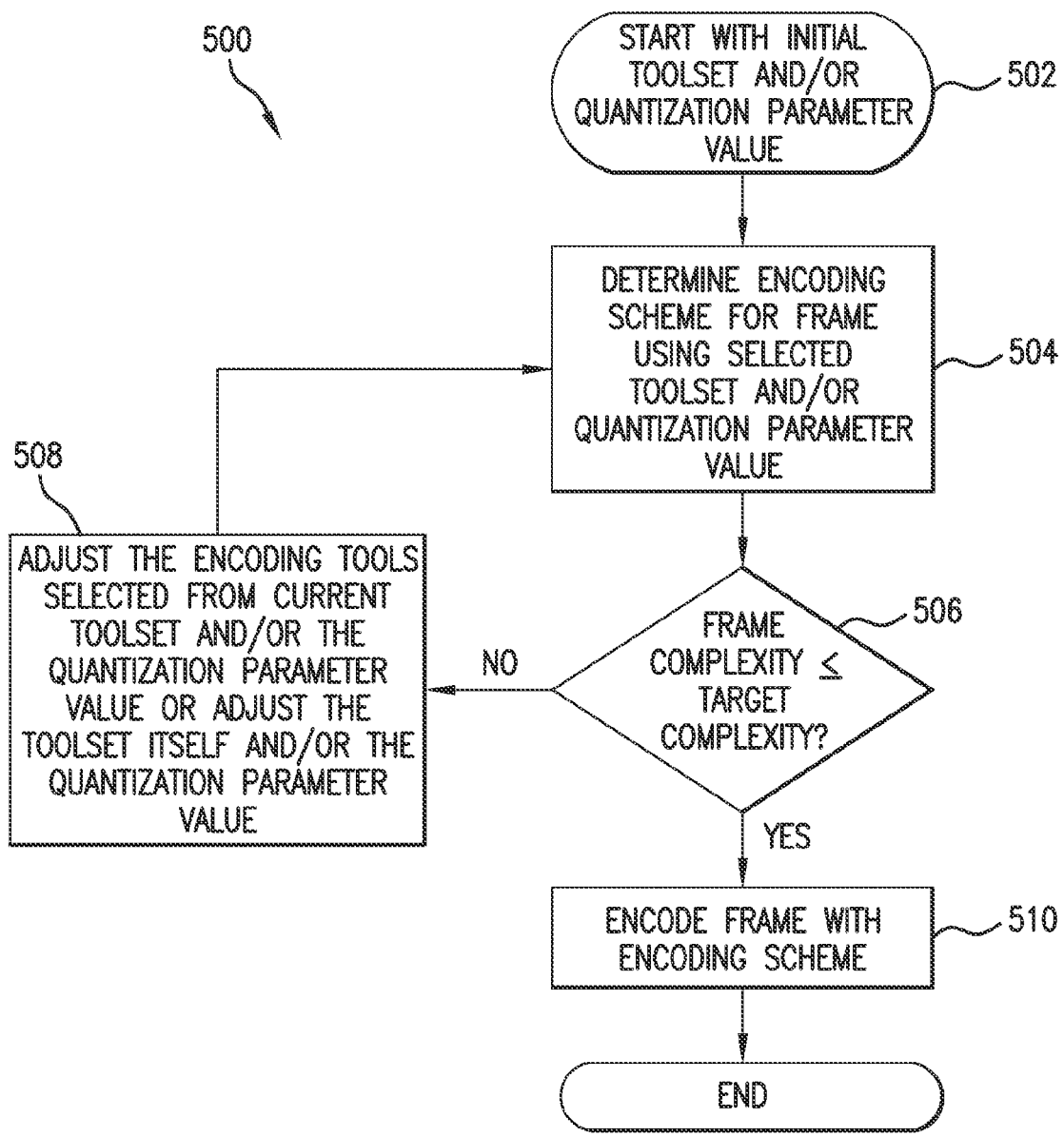
FIG. 5 illustrates an embodiment of a process for encoding a frame.

FIG. 5 illustrates an embodiment of a process for encoding a frame. In some embodiments, process 500 is employed at 204 of process 200 of FIG. 2. In some embodiments, process 500 is employed at 302 and 304 of process 300 of FIG. 3. In some embodiments, process 500 is employed at 408 of process 400 of FIG. 4. Process 500 starts at 502 with an initial toolset and/or quantization parameter value that are to be used to determine at least an initial encoding scheme for the frame. In some embodiments, the initial toolset of 502 corresponds to a default toolset that, for example, includes all available encoding tools at an associated encoder and wherein equal complexity cost weightings (e.g., one) are assigned to each of the tools. In some embodiments, the initial toolset of 502 corresponds to a toolset determined to be used for a previous frame. At 504, an encoding scheme is determined for the frame using the toolset and/or quantization parameter value of 502. In some embodiments, determining the encoding scheme of the frame at 504 includes determining the encoding scheme of each macroblock included in the frame using one or more encoding tools available in the toolset. In some embodiments, a least cost encoding scheme is sought for the frame as a whole, for example, by employing an optimization formula such as Equation (1) or Equation (2) to iteratively determine an encoding scheme with the lowest cost that still satisfies minimum encoding standards for each macroblock comprising the frame and that guarantees a prescribed decoded data quality. In some embodiments, an encoding scheme with a minimum associated decoding complexity is sought for the frame as a whole, for example, by determining an encoding scheme associated with minimum decoding complexity for each macroblock that still satisfies minimum encoding requirements that guarantee a predetermined decoded data quality.

At 506, it is determined whether the complexity of the frame encoded with the encoding scheme determined for the frame at 504 is within (i.e. less than or equal to) the target complexity associated with the frame. In some embodiments, the frame complexity is determined by adding together the complexity costs associated with the encoding schemes selected for the macroblocks comprising the frame. In some embodiments, the complexity of the frame is determined by employing Equation (3). In some embodiments, 506 includes determining whether the complexity of the frame is equal to or is within a certain percentage below the target complexity of the frame so that an encoding scheme with a maximum decoding complexity within the target complexity can be possibly iteratively determined using process 500 so as to ensure a best possible playback at a target decoder.

If it is determined at 506 that the frame complexity is not within the target complexity of the frame, e.g., the frame complexity is greater than the target complexity or is not within a fixed percentage below the target complexity of the frame, the encoding tools selected from the current toolset for one or more macroblocks and/or the quantization parameter value are adjusted or the toolset itself and/or the quantization parameter value are adjusted at 508, and process 500 continues with 504 at which another encoding scheme is determined for the frame (i.e. the macroblocks comprising the frame) using the toolset and/or quantization parameter value selected at 508. In some embodiments, the adjustments of 508 are intelligently made based upon, for example, knowledge of the sources of complexity in the content of the frame, knowledge of which encoding tools are preferred for encoding the content of the frame, knowledge of which encoding tools are contributing more heavily to the decoding complexity, etc. If it is determined at 506 that the frame complexity is within the target complexity (or is within a prescribed percentage of the target complexity), at 510 the frame is encoded with the encoding scheme determined for the frame at 504, and process 500 ends. In some embodiments, process 500 is repeatedly performed to encode one or more frames included in a sequence of video data.

Figure 6:
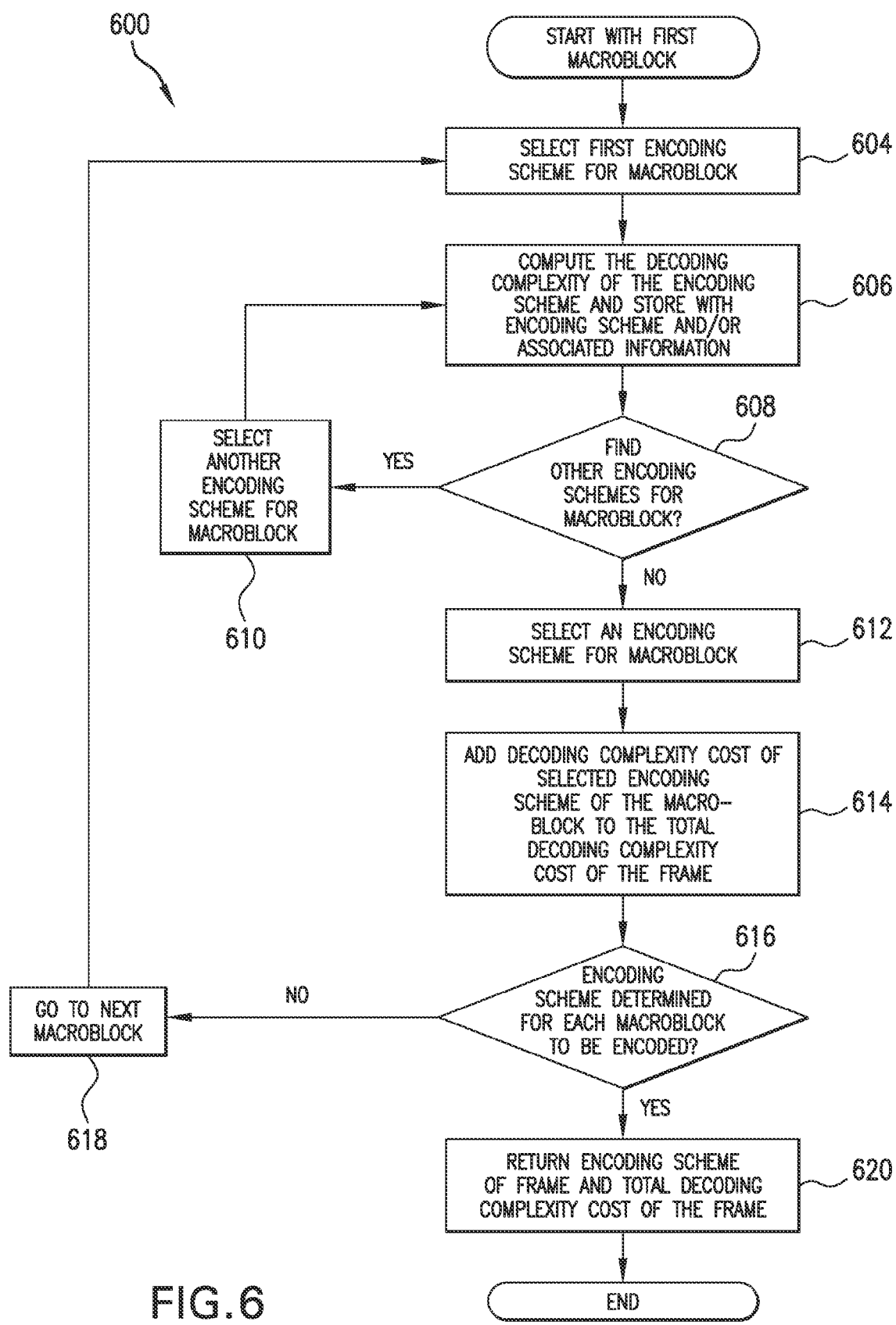
FIG. 6 illustrates an embodiment of a process for determining an encoding scheme for a frame and the associated cost or complexity of the frame.

FIG. 6 illustrates an embodiment of a process for determining an encoding scheme for a frame and the associated cost or complexity of the frame. In some embodiments, process 600 is employed at 504 of process 500 of FIG. 5. In some embodiments, a single selected toolset and/or quantization parameter value is used to determine an encoding scheme for a frame in process 600, and one or more of the encoding tools available in the selected toolset are employed to determine one or more encoding schemes for each macroblock of the frame that is to be encoded. Process 600 starts at 602 with a first macroblock of the frame for which an encoding scheme is to be determined. At 604, a first encoding scheme is determined for the macroblock of 602. In some embodiments, optimization formulae such as Equation (1) or Equation (2) are employed to aid in the selection of an encoding scheme at 604. At 606, the decoding complexity or cost of the encoding scheme selected at 604 is computed. In some embodiments, the decoding complexity of the encoding scheme determined at 604 is computed at 606 by summing the possibly weighted, target decoder-specific complexity costs of the encoding tools and/or quantization parameter used for the encoding scheme, wherein the weightings of the complexity costs of the encoding tools in some embodiments depend upon the toolset being used to determine the encoding scheme of the frame. In some embodiments, 606 includes storing the computed decoding complexity or cost with the encoding scheme and/or associated information, such as cost, rate, distortion, etc., so that the encoding scheme can be compared with other potential encoding schemes of the macroblock. In some embodiments, such stored information is used, if available and/or appropriate, when determining another encoding scheme for a frame (i.e. when determining possibly different encoding schemes for one or more macroblocks of the frame) such as, for example, when the total complexity of the frame exceeds the target complexity of the frame, such as at 506 of process 500 of FIG. 5, and, for instance, the same selected toolset and/or quantization parameter value is to be used to determine a different encoding scheme for the frame.

At 608, it is determined whether to find other encoding schemes for the macroblock. In some embodiments, it is determined to find another encoding scheme at 608 so that an optimal encoding scheme can be found for the macroblock given the selected toolset and/or quantization parameter value. If it is determined at 608 to find other encoding schemes for the macroblock, another encoding scheme is selected for the macroblock at 610, e.g., using the same selected toolset and/or quantization parameter, and process 600 subsequently returns to and continues with 606 at which the decoding complexity of the encoding scheme selected at 610 is computed and stored with the encoding scheme and/or information associated with the encoding scheme. In some embodiments, steps 610, 606, and 608 of process 600 are iterated one or more times to obtain and to store for comparison various encoding schemes, associated decoding complexities, and/or other associated information so that an optimal encoding scheme can be selected for the macroblock. The encoding schemes selected for the macroblock (e.g., at 604 and 610) are in some embodiments based at least in part on a rate-distortion optimization formula (e.g., Equation (1)) or a modified rate-distortion optimization formula (e.g., Equation (2)). If it is determined at 608 not to find another encoding scheme for the macroblock (e.g., because one or more encoding schemes from which to choose from have already been determined, because further resources are not desired to be expended in the determination of other encoding schemes because of, for example, time or processing constraints, because a suitable encoding scheme has been found, etc.), an encoding scheme is selected for the macroblock at 612, for example, from a set of one or more encoding schemes determined for the macroblock at 604 or 610. In some embodiments, a comparison of the encoding scheme(s), associated decoding complexities, and/or other associated information that were stored for the macroblock at 606 is employed to select an encoding scheme for the macroblock at 612. At 614, the decoding complexity cost associated with the encoding scheme selected for the macroblock at 612 is added to a running sum of decoding complexity costs that in some embodiments represents the total decoding complexity of the entire frame and that includes the individual decoding complexity costs of the encoding schemes selected for the macroblocks comprising the frame.

At 616, it is determined whether an encoding scheme has been determined for each macroblock of the frame that is to be encoded. If it is determined at 616 that an encoding scheme has not been selected for all of the macroblocks of the frame that are to be encoded, process 600 continues at 618 with a macroblock for which an encoding scheme has not yet been selected and returns to and continues with step 604 at which a first encoding scheme is determined for the macroblock of 618. In some embodiments, the encoding scheme selected at 604 for the macroblock of 618 is based at least in part upon the encoding schemes selected for one or more previous macroblocks. If it is determined at 616 that an encoding scheme has been determined for all of the macroblocks of the frame that are to be encoded, the encoding scheme of the frame as a whole (which in some embodiments is comprised of the encoding schemes of the macroblocks comprising the frame) as well as the total decoding complexity of the frame (i.e. the final value of the running sum of decoding complexity costs of 614) is returned at 620, and process 600 ends. In some embodiments, instead of calculating the total decoding complexity of the frame as a running sum of the decoding complexities of the encoding schemes of the macroblocks that comprise the frame, the total decoding complexity of the frame is computed using Equation (3), which is based upon the number of times various encoding tools are employed and the target decoder-specific complexity costs associated with the encoding tools as well as any possible weightings of the complexity costs depending on the toolset being used to encode the frame. In some embodiments, instead of or in addition to computing the decoding complexity of each macroblock (e.g. at 606) and the total decoding complexity of the frame (i.e. the running sum of 614), an optimization formula such as Equation (1) or Equation (2) is employed to compute the cost of the encoding scheme of each macroblock, and the computed cost is added to a running sum of such costs that represents the total cost of the frame. In some such cases, a total cost of a frame is compared to a target cost for the frame, such as at 506 of process 500 of FIG. 5, when determining an appropriate encoding scheme for the frame.

Figure 7:
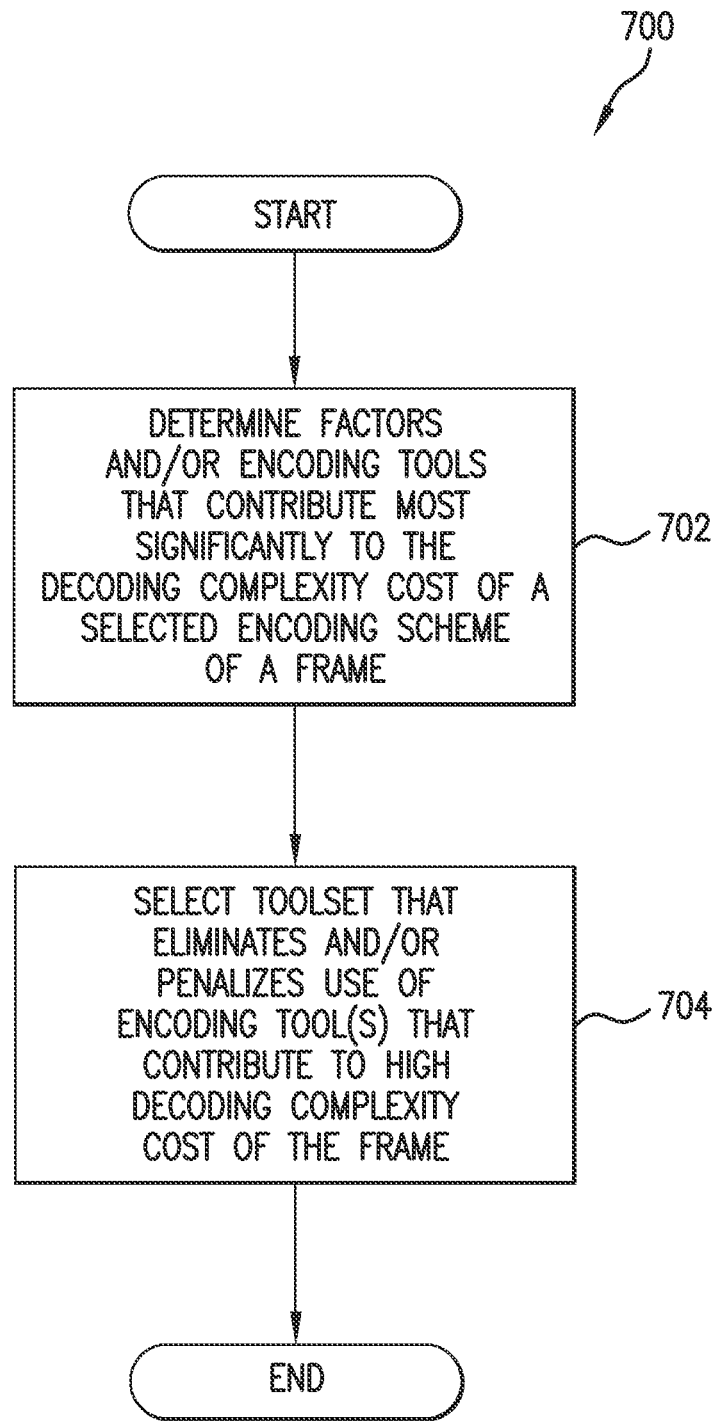
FIG. 7 illustrates an embodiment of a process for adjusting the toolset used for the encoding of a frame.

FIG. 7 illustrates an embodiment of a process for adjusting the toolset used for the encoding of a frame. In some embodiments, process 700 is employed at 508 of process 500 of FIG. 5. Process 700 starts at 702 at which the factors and/or encoding tools that contribute the most significantly to the decoding complexity cost of a selected encoding scheme for a frame are determined. In some embodiments, the factors and/or encoding tools that contribute the most significantly to the decoding complexity cost of the encoding scheme for the frame determined at 504 of process 500 of FIG. 5 are analyzed at 702. In some embodiments, 702 includes determining the portions of the content of the frame that result in high decoding complexity costs when encoded with the selected encoding scheme. In some embodiments, 702 includes determining the encoding tools and/or other parameters that contribute the most to the decoding complexity cost of the encoding scheme of the frame. At 704, a toolset is selected that eliminates and/or penalizes (e.g., by complexity cost weights) the use of one or more encoding tools that were determined at 702 to most significantly contribute to the decoding complexity cost of the frame. In some embodiments, 704 includes adjusting the value of the quantization parameter. The quantization parameter may be intelligently adjusted according to the desired complexity and the complexities associated with the toolset selected. For example, the quantization parameter may be adjusted at least in part to offset the effect of modifying the toolset to be used for the encoding of the frame. For instance, a finer quantization value may be selected at 704 to offset the effect of selecting a toolset at 704 with limited encoding options and/or complexity. Although adjusting the quantization parameter value has been described herein, other parameters that affect the complexity of encoding a frame may also be similarly adjusted as necessary at 704. Process 700 subsequently ends.

Figure 8:
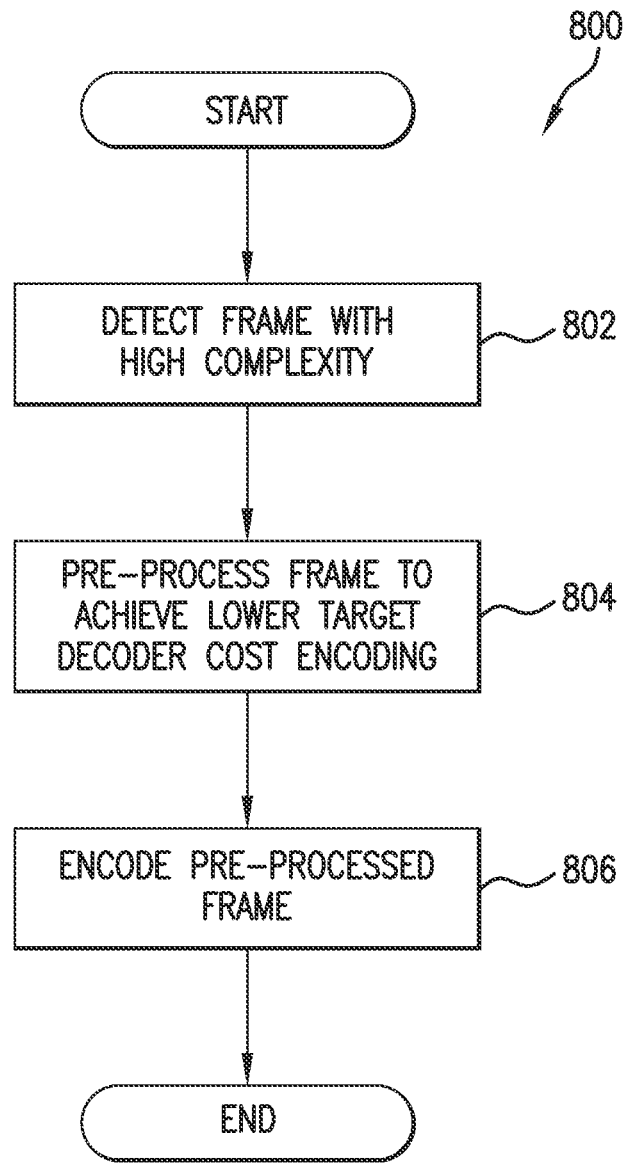
FIG. 8 illustrates an embodiment of a process for pre-processing one or more frames.

FIG. 8 illustrates an embodiment of a process for pre-processing one or more frames. In some embodiments, a frame is (or based on selection criteria may be) pre-processed before encoding to facilitate the selection of a better encoding scheme for the frame. In some embodiments, a frame is or may be pre-processed to reduce the entropy in the frame. For example, when encoding a frame of a video sequence that has a high complexity using a toolset with limited encoding options and/or complexity, in some embodiments the frame is pre-processed before encoding to gracefully degrade the content of the frame and avoid compression artifacts in the encoded frame. In some embodiments, if it can be determined (e.g., by analyzing the frame, from an attempted iteration of encoding the frame, from the encoding of a related or similar frame, etc.) that the optimal or near optimal encoding of some portion of the content of the frame requires a technique that is very expensive or that can not be handled by a target decoder, such content is reduced and/or removed from the frame before it is encoded. Process 800 starts at 802 at which a frame with high complexity is detected. At 804, the frame detected at 802 is appropriately pre-processed so that a lower target decoder cost encoding can be achieved for the frame. For example, if the frame detected at 802 is determined to be noisy, it may be pre-processed using a spatial or smoothing filter at 804 to reduce and/or remove the noise so that the encoding of the frame is not affected or at least is less affected by the noise present in the original frame data. At 806, the pre-processed frame is encoded, and process 800 ends. In some embodiments, process 800 is employed in the pre-processing of one or more related or consecutive frames of a video sequence that need to be encoded. For example, if it is known at the encoder side that a target decoder will not be able to handle every frame in a sequence of video content or a subset thereof, temporal filtering across one or more consecutive frames in the sequence may be employed before encoding. For instance, the content of two or more consecutive frames may be averaged or frames may be down-sampled (e.g., frames may be selected to be encoded and provided to the target decoder at half rate, i.e. every other frame in a sequence of video content may be selected to be encoded and provided to the target decoder). In some embodiments, the down-sampling of frames may be intelligently performed. For example, only frames that change significantly between two or more consecutive frames may be selected for encoding and transmittal to the target decoder.

In some embodiments, an encoder employs scalability to facilitate graceful degradation at the decoder side when necessary, for example, when the decoder can not keep up due to limited processing power and/or memory, when battery power is running low or is desired to be conserved at the associated device, etc. In some embodiments, temporal scalability allows a target decoder to gracefully drop frames and effectively reduce the frame rate at the decoder side when needed. In some such cases, temporal scalability is incorporated at the encoder side by the intelligent selection of the pattern of reference and non-reference frames in a sequence or stream of video content. In some embodiments, the pattern of reference and non-reference frames is selected so as to maximize the viewing experience at the target decoder even if some frames, preferably one or more non-reference frames, have to be dropped. For example, if a subset of a sequence of video content is detected to have high complexity, more frames in the subset may be marked as non-reference frames at the encoder side based upon, for example, an estimate of the ability of a target decoder to handle the associated complexity. Similarly, if an individual frame is determined at the encoder side to be highly complex and has an encoding scheme that is characterized by a high decoding cost, it may be selected to be a non-reference frame so that the target decoder has the option of dropping the frame without causing significant degradation in viewing experience if it is running behind. In some embodiments, the encoder side includes a process or algorithm for selecting the pattern of reference and non-reference frames for a sequence of video content that is based at least in part upon known characteristics and expected performance of the target decoder available at the encoder side via the model of the target decoder at the encoder, knowledge of the complexity of other data that has been or subsequently will be provided to the target decoder for decoding, and/or dynamic feedback from the decoder regarding its current performance. In addition to or instead of temporal scalability, one or more other scalability layers may be included in the encoding of a frame at the encoder side to allow for more graceful degradation at the decoder side. In some embodiments, one or more scalability layers are selected at the encoder side in a manner that minimizes the playback or viewing quality penalty experienced at the decoder side. The amount of scalability built into an encoded bit stream may vary and may depend upon the local complexity of the bit stream.

Figure 9:
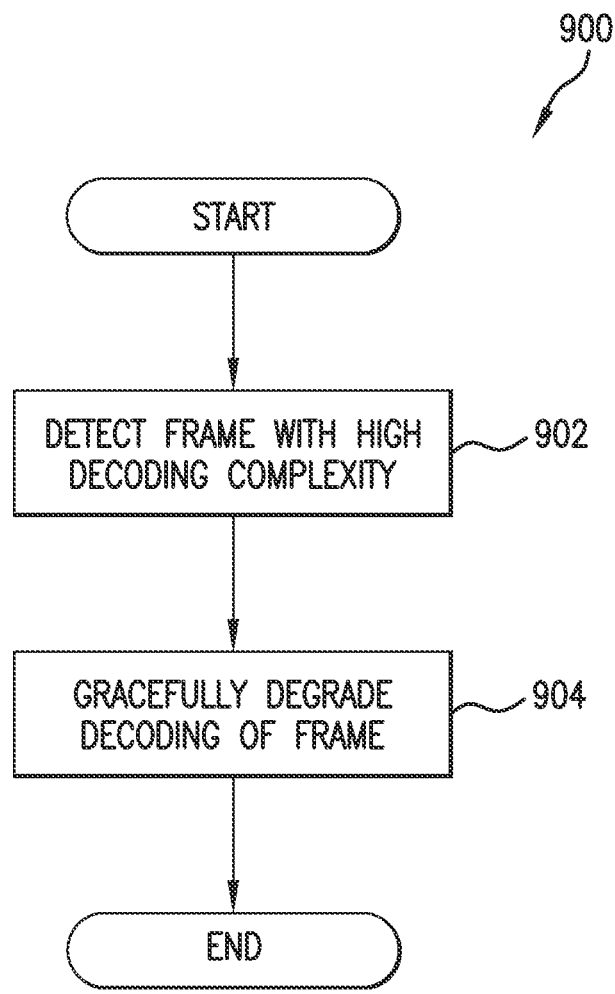
FIG. 9 illustrates an embodiment of a process for gracefully degrading the decoding of an encoded frame at a target decoder.

FIG. 9 illustrates an embodiment of a process for gracefully degrading the decoding of an encoded frame at a target decoder. In some embodiments, process 900 is employed at a target decoder when a decoder begins falling behind in the decoding of an encoded video sequence, for example, due to processing or power consumption constraints at the target decoder. Process 900 starts at 902 at which a frame with a high decoding complexity is detected. At 904, the decoding of the frame of 902 is gracefully degraded. In some embodiments, 904 includes degrading the decoding of the frame in a manner that ensures that the viewing experience of the overall sequence of video content of which the frame is a part is maximized and that the visual quality is kept constant or nearly constant over time. In some embodiments, 904 includes not decoding the frame at all (i.e. dropping the frame), for example, because the frame has a high decoding complexity. In some such cases, reference frames are given higher decoding priority, and a frame may only be completely dropped if it is a non-reference frame so that other frames in an associated video sequence are not affected by the dropping of the frame. In some embodiments, 904 includes performing the most significant decoding operations and dropping one or more other decoding operations that need to be performed to fully decode the frame. Such a technique may result in a lower quality decoding of the frame and may be useful if a frame is not desired to be completely dropped and limited decoding resources are available at the decoder at the time the frame is to be decoded. Similarly, in some embodiments, decoding operations associated with one or more scalability layers associated with the encoding of the frame are dropped to obtain a lower quality decoding of the encoded frame. Process 900 subsequently ends.

As is disclosed herein, by intelligently selecting an encoding scheme for data at an encoder based upon the decoding complexity that can be handled by the available decoding resources at a target decoder to which the data is to be provided, an optimal or near optimal decoding performance and playback quality may be experienced at a target decoder. Moreover, pre-processing the data before encoding it may aid in the reduction of decoding complexity of the encoded data. When needed, graceful degradation during the decoding of the encoded data may be facilitated through scalability incorporated into the encoding scheme of the data. Post-processing at the decoder may be used to improve the quality of decoded data. Other than the actual encoded data, information related to the encoding of the data may be provided to the target decoder by the encoder to aid in the decoding and/or post-processing of the data. As disclosed herein, the incorporation of intelligence in the encoding and/or decoding processes of a codec enables a better decoded data quality to be experienced at a target decoder.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method for encoding video data, comprising:
   estimating, at an encoder, a cost of decoding a sequence of coded video by a target decoder to which encoded data is to be transmitted,
   encoding the video data according to encoding parameters selected in response to the estimated cost of decoding by the target decoder, wherein the encoding comprises coding the video data as a plurality of scalability layers that can be selectively omitted from decoding.

2. The method of claim 1, further comprising selecting the encoding parameters according to:
   selecting an initial set of encoding parameters to be used for coding a sequence of video data,
   iteratively, until a final set of encoding parameters are selected that can be processed by a target decoder:
   estimating a cost of decoding a sequence of coded video which has been coded according to the selected set of encoding parameters
   comparing the estimated cost of decoding to processing resources available at a target decoder to which the coded video is to be transmitted,
   if the estimated cost exceeds processing resources available at the target decoder, reselecting the set of encoding parameters for a next iteration;
   wherein the encoding codes the sequence of video data according to the final set of encoding parameters.

3. The method of claim 2, wherein the method is performed anew for each frame of the video sequence.

4. The method of claim 2, wherein the method is performed on a sliding window basis, considering a plurality of frames of the video sequence in a window.

5. The method of claim 2, wherein the comparing comprises estimating processing resources available at the target decoder according to decoding costs induced by encoding parameters of a prior coded sequence of video data.

6. The method of claim 1, wherein scalability layers can be selectively omitted from decoding if the target decoder cannot process all layers in real time.

7. The method of claim 1, wherein scalability layers can be selectively omitted from decoding if the target decoder decodes the coded video data in a power conservation mode.

8. The method of claim 1 further comprising:
   determining the decoding capability of a target decoder to which the encoded data is to be sent;
   estimating the complexity of the input data on a sliding window scale; and
   encoding the input data in the sliding window based on the decoding capability of the target decoder and the estimated complexity of the input data, wherein
   the encoding comprises increasing the number of frames of input data assigned as non-reference frames as the estimated complexity increases, and
   the estimated complexity of the input data increases in response to a determination that the decoding capability of the target decoder is degraded.

9. The method of claim 8, wherein the determination of degraded decoding capability is based on an estimate from a model of the target decoder.

10. The method of claim 8, wherein the determination of degraded decoding capability is based a communication received from the target decoder via a feedback channel identifying the decoding capability of the target decoder.

11. The method as recited in claim 10, wherein the communication indicates that the decoder device is experiencing a reduced battery power level.

12. The method as recited in claim 10, wherein the communication indicates that the decoder device is experiencing an increased processor workload.

13. The method as recited in claim 10, wherein the communication identifies decoding algorithms available for use by the target decoder.

14. The method as recited in claim 10, wherein the communication identifies available decoder processing speed.

15. The method as recited in claim 10, wherein the communication identifies power consumption limitations at the target decoder.

16. The method as recited in claim 10, wherein the communication identifies memory resources available at the target decoder.

17. A method for encoding a set of data, comprising:
   estimating a processing state of a target decoder to which encoded data is to be transmitted,
   selecting an initial set of encoding parameters to be used for coding a sequence of video data,
   iteratively, until a final set of encoding parameters are selected that can be processed by a target decoder:
   estimating a cost of decoding a sequence of coded video which has been coded according to the selected set of encoding parameters
   comparing the estimated cost of decoding to processing resources available at a target decoder to which the coded video is to be transmitted,
   if the estimated cost exceeds processing resources available at the target decoder, reselecting the set of encoding parameters for a next iteration;
   encoding the sequence of video data according to the final set of encoding parameters selected in response to the estimated state of the target decoder, wherein the encoding comprises coding the video data as a plurality of scalability layers that can be selectively omitted from decoding.

18. The method as recited in claim 17, wherein the selecting an initial set of encoding includes selecting a quantization parameter value that is used to estimate the cost of decoding.

19. The method as recited in claim 17, wherein the initial set of encoding parameters is an encoding toolset selected from a plurality of encoding toolsets.

20. The method as recited in claim 17, wherein the estimating the processing state of the target decoder includes simulating the processing state of the target decoding using one or more of a decoding processing rate, a maximum capacity of a decoded picture buffer of the target decoder, and the display duration of each frame in the decoded picture buffer of the target decoder.

21. The method of claim 17, wherein scalability layers can be selectively omitted from decoding if the target decoder cannot process all layers in real time.

22. The method of claim 17, wherein scalability layers can be selectively omitted from decoding if the target decoder decodes the coded video data in a power conservation mode.

\* \* \* \* \*